Feb. 2, 1965   E. P. WARNERY   3,168,273
TRIPOD STRUCTURE

Filed May 9, 1963   3 Sheets-Sheet 1

INVENTOR
EDMOND P. WARNERY
BY Karl J. Ross
AGENT

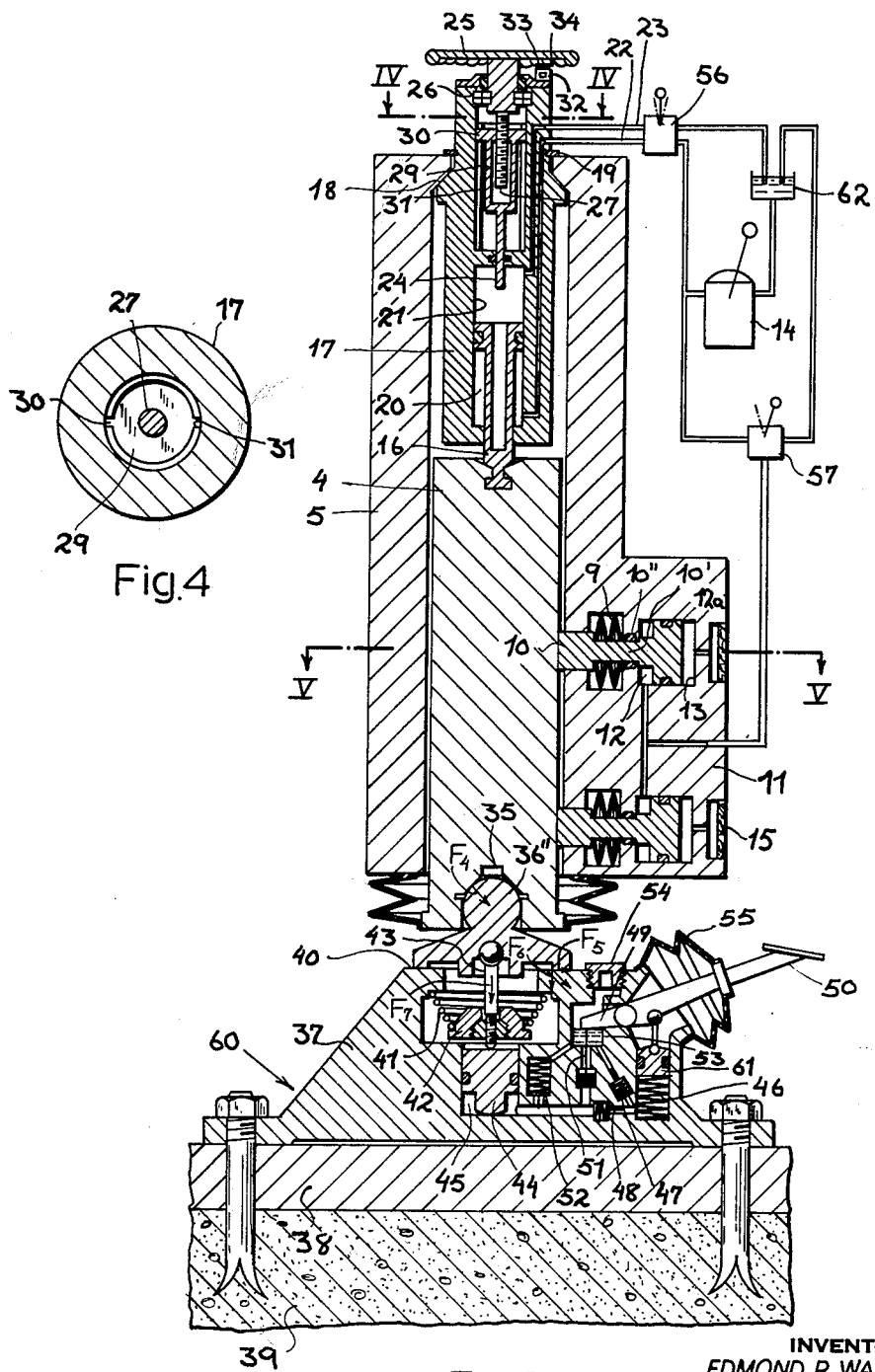

3,168,273
TRIPOD STRUCTURE
Edmond P. Warnery, Boulogne-sur-Seine, Seine, France, assignor to Compagnie Francaise Thomson-Houston, Paris, France, a corporation of France
Filed May 9, 1963, Ser. No. 279,058
Claims priority, application France, May 17, 1962, 897,842
20 Claims. (Cl. 248—157)

This invention relates to supporting structures of a type especially suitable for the support of heavy apparatus requiring delicate positional adjustment for the proper operation thereof. One important example of apparatus of this character, and for the support of which the structure of the invention is eminently suitable, is a turret assembly, such as a radar antenna, for the accurate monitoring of positional and other characteristics of moving targets including both air and space craft.

In apparatus of this kind and more generally in all circumstances where the supported apparatus must retain a fixed orientation or attitude with respect to earthbound coordinates, it is imperative that the supporting structure for the apparatus should possess high rigidity both in itself and in the connections between it and its foundation in the ground; it should admit of extremely fine positional adjustment especially in respect to the verticality of a reference direction of the structure; and it should be so constructed that such adjustment thereof will be relatively insensitive to disturbing forces, including inter alia any forces imposed by variations in temperature.

It is a broad object of this invention to provide such supporting structure, in the form of a tripod or pedestal mount, which will fulfill the above and other important requirements to a degree considerably superior to that achieved by any supporting structure heretofore available or to my knowledge proposed.

Specific objects are to provide a tripod-type supporting structure which can be built to posses large mass and/or moment of inertia for the highly stable support of large-size and heavy-weight apparatus, will nevertheless be susceptible to extremely fine adjustment as to vertical elevation and orientation with respect to an earthbound reference plane or direction, and will satisfactorily maintain its adjusted setting in the presence of external disturbing forces, including the intense strains that will normally tend to be set up in such a structure by the effects of temperature variations. Another object is to provide means for quickly and easily removing any temperature-induced strains and tensions from a large and heavy tripod structure by allowing the tripod to readjust its geometry and dimensions to a new tension-free condition of equilibrium. A further object is to provide means for positively blocking a supporting structure of the kind described both against disturbing forces tending to displace it from its horizontal position on its base and against forces tending to disturb its orientation or attitude setting, without detracting from the ease with which the structure can be adjusted and readjusted from time to time. Another object is the provision of an advantageous self-centering feature between the three lateral supports of a tripod frame and an immovable base therefor. Other objects will appear as the discloseure proceeds.

In accordance with an important aspect of the invention I provide a tripod structure comprising a frame, three supports secured to the frame at the apices of a triangle and having each a load-transmitting member mounted on a base whose lower surface fixedly engages a common foundation, at least two of said members being laterally shiftable relatively to the foundation but being normally urged under pressure against the foundation with sufficient force to ensure that friction will prevent their shifting, and actuator means in the bases of the shiftable supports operable for applying vertical pressure-relieving forces thereto to reduce the friction to a value small enough to allow the corresponding load-transmitting members to shift laterally for taking up dimensional changes caused by differential thermal expansion between the frame and the foundation.

An exemplary embodiment of the invention will now be described for purposes of illustration but not of limitation, with reference to the accompanying drawing, wherein:

FIG. 3 is a view in vertical axial section of one of the three supporting assemblies of the tripod, specifically the assembly designated $L_3$ in FIG. 1, with a schematic showing of an associated fluid pressure system;

FIG. 4 is a section on line IV—IV of FIG. 3; and

Figure 1:
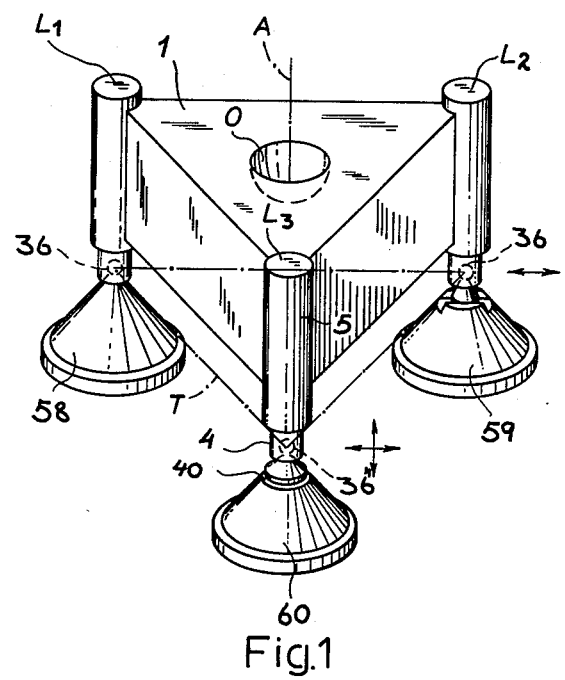
FIG. 1 is a perspective view, simplified, of a tripod structure according to the invention, with many of the important ancillary features, shown especially in FIG. 3, omitted for clarity.

The tripod mounting system generally shown in FIG. 1 comprises a frame 1 in the general form of a triangular prism. Integrally formed with or secured to the pedestal frame 1 at the three sides of the prism are three generally vertical legs or supporting assemblies L1, L2, and L3, each including a cylindrical casing 5 from the open bottom end of which projects the outer end of an adjustable plunger 4. Each plunger 4 has its lower end recessed to provide a tapered seat for a load-transmitting spherical member 36, 36' or 36" in a manner that will be later described in detail with reference to FIG. 3. The three load-transmitting members 36, 36', 36" in turn are supported at the top of respective base structures 58, 59 and 60 which in turn are firmly secured to a suitable concrete foundation structure 39 (see FIG. 3).

For purposes related to temperature-compensating adjustment and, to be discussed in detail later, the spheroidal load-transmitting members 36, 36', 36" in the three assemblies L1, L2 and L3 are connected with the related base structures 58, 59 and 60 in three different ways. Specifically, in one of the three assemblies, here the assembly L1, the member 36 is fixedly secured to the related base structure 59. In another of the assemblies, L2, the member 36' is mounted so as to be displaceable relative to the related base structure 59 towards and away from the fixed member 36 i.e. along a line substantially coincident with that side of the triangle T defined by the centers of the spheres 36, 36', 36", which passes through jack assemblies L1 and L2. Lastly, in the assembly L3, the load-transmitting member 36" is mounted for displacement with respect to the related base assembly 60 along a horizontal plane. Otherwise stated, in assembly L1 the load-transmitting member 36 has no freedom of motion whatever with respect to the base 58; in the assembly L2 the member 36' has one degree of freedom relative to base 59 as indicated by the double arrow; and in assembly L3 the member 36" has two degrees of freedom relative to base 60 as indicated by the two double arrows.

Figure 2:
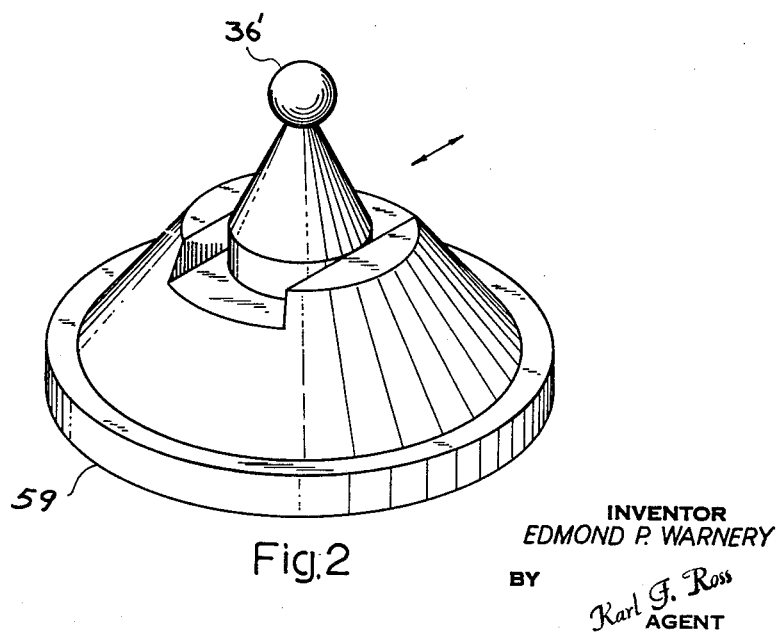
FIG. 2 is a larger-scale perspective view of part of FIG. 1, showing the means used for providing one of the tripod legs with a single degree of freedom for lateral shifting.

FIG. 2 illustrates in a general way the manner of mounting of load-transmitting member 36' of assembly L2 with respect to its base 59 so as to provide the desired single, or linear, degree of freedom with respect thereto. It will be seen that the member 36' is formed integrally with a spheroidal head and an enlarged bottom extension having accurately machined parallel sides slidable with minimum clearance within a complementary rectilinear groove formed in the top of base 59. As to the mounting of the member 36″ of assembly L3 with respect to its base 60 with the two degrees of freedom indicated above, this will be described in detail presently.

Generally speaking, each of the supporting leg assemblies L1, L2, L3 has the following hydraulic means associated with it: hydraulic means for vertically adjusting the position of casing 5 with respect to plunger 4, these means including provision for both crude and fine adjustment; hydraulic means for releasing and blocking the plunger 4 in its casing 5 to permit the foregoing vertical adjustment and to block the device in an adjusted setting; further, in conjunction with each of the two assemblies L2 and L3, hydraulic means are provided for relieving the downward pressure due to gravity exerted through load-transmitting member 36′ or 36″ onto the respective base 59 or 60, in order to permit relative horizontal shifting of the number 36′ or 36″ with respect to the base as made possible by the movable mounting thereof for purpose of temperature compensation. The various above enumerated means will now be described in detail.

Figure 5:
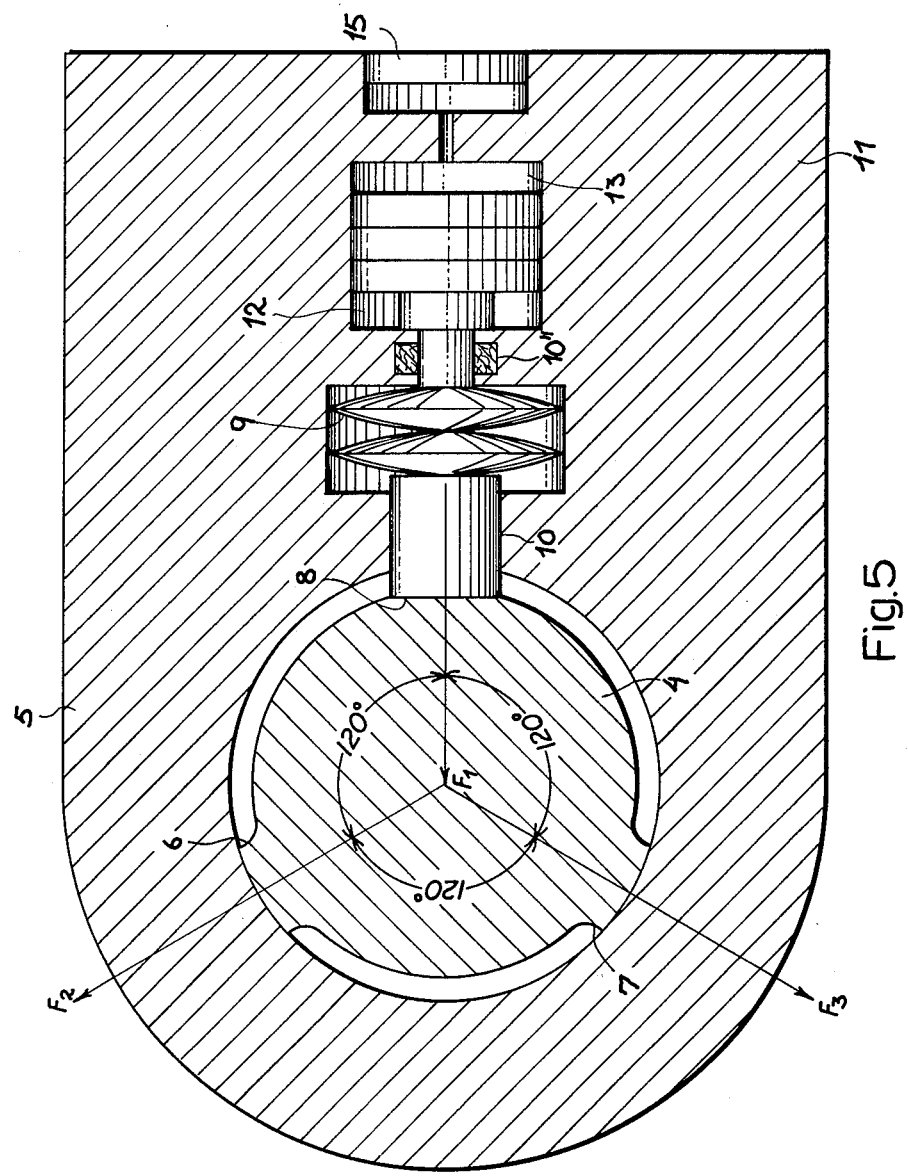
FIG. 5 is a section on line V—V of FIG. 3.

This description will be made primarily with reference to FIG. 3 which illustrates the side assembly L3. The details in which its construction differs from that of the other two assemblies L1 and L2 will be pointed out later. Upon referring then to FIG. 3 and to FIGS. 4 and 5 which show details thereof, it will be seen that the plunger 4 is a massive cylindrical member slidable in the lower part of the vertical bore in casing 5. As shown in FIG. 5, plunger 4 over a major part of its periphery is smaller in radius than the bore, and is provided with two bearing surfaces 6 and 7 in the form of longitudinal ribs having outer surfaces machined for accurate sliding engagement with the inner surface of said bore. The two bearing areas 6 and 7 are spaced approximately 120° apart from each other around the periphery of plunger 4; in the area spaced about 120° from both the areas 6 and 7, so as to define substantially an equilateral triangle therewith, is a longitudinal flat area 8. In this area the plunger 4 is subjected to the action of lateral blocking means serving to exert a lateral force for immobilizing the plunger member 4 in its cylinder casing 5. As shown, there are provided two vertically spaced blocking assemblies positioned in a side extension 11 of the casing 5. Each of these assemblies comprises a presser member 10 having a head portion engaging the flat bearing surface 8 of member 4 through an opening in the side of casing 5, and a shank 10′ extending from the rear of said head portion through a spring chamber formed in the casing. A stack of Belleville washers 9, or equivalent spring means, are positioned in the spring chamber as shown and apply pressure between a rear shoulder of the head of presser member 10 and the opposite wall of the spring chamber to urge the presser member against the flat 8 of plunger 4. The shank 10′ of the presser member 10 extends through the said opposite wall of the spring chamber by way of a seal ring 10″, as shown, and projects into a hydraulic chamber 12a provided beyond the spring chamber. In said hydraulic chamber the shank 10′ of the presser member 10 is constituted as a piston sealingly slidable in said chamber and defining therein a forward high pressure compartment 12 and a rear atmospheric compartment 13, the latter communicating with the outer atmosphere by way of a passage provided with an air-filtering plug 15. The high pressure compartment 12 communicates with a supply line for pressure fluid, e.g. oil, from a suitable source such as a hand pump 14 by way of a three-way selector valve 57, these parts being referred to later in greater detail. It will already be evident, however, that admission of pressure oil into the compartment 12 will serve to retract both presser members 10 and thereby release the plunger 4 for free vertical adjusting displacement with respect thereto.

The hydraulic means for vertically displacing the casing 5 with respect to the plunger 4 will now be described. This comprises essentially a hydraulic actuator positioned in the upper part of the bore in casing 5 and including an actuator cylinder 17 attached at its top to the top of the casing 5. Preferably, as shown, the attachment is self-centering and for that purpose the upper end of actuator cylinder 17 is formed with an enlarged, partially spherical surface 18 seated against a substantially complementary downwardly facing surface formed at the top of the bore in casing 5; a retainer ring 19 projecting from a circumferential groove in the upper part of actuator cylinder 17 is seated against the flat upper surface of casing 5 for suspending the cylinder 17 therein. The cylinder 17 has a piston 16 slidable in a bore formed in a lower part of the cylinder, said piston projecting through the lower end of the cylinder and being attached to the center of the upper end of the piston member 4 through a pivotal suspension arrangement as shown, also for self-centering purposes. The piston 16 defines within its bore in cylinder 17 a lower compartment 20 and an upper compartment 21, which are connected by way of respective conduits 22 and 23 to the oil-pressure source 14 through a four-way valve 56. The oil circuit includes, as shown, the manual oil pump 14, an oil reservoir 62, and the two selector valves 57 and 56 previously referred to.

With the four-way selector valve 56 in its neutral position, this valve, which is of the closed-center type, blocks off both compartments 20 and 21 from the external circuit, thus locking the piston 16 in its instant position. With valve 56 displaced to one side of neutral, one of the chambers 20, 21 is connected with pump 14 and the other with reservoir 62; with the valve 56 displaced to the opposite side, the reverse condition obtains. It will be apparent therefore that with valve 56 displaced to connect upper chamber 21 with pump 14 and lower chamber 20 to reservoir 62, actuation of pump 14, manually or otherwise, will cause cylinder 17, and with it casing 5 and the entire associated side of the tripod frame 1, to move upwards relatively to plunger 4, while with valve 56 displaced to the reverse position the force of gravity will cause casing 5 to move downwards relatively to plunger 4. The rate of upward and downward displacement can to a certain extent be controlled by the extent of the shift of valve 56 from its neutral position.

In the foregoing I have described the hydraulic setting means for coarse vertical adjustments of casing 5. The fine adjusting means, now to be described, comprises a handwheel 25 rotatable about a vertical axis above the top of actuator cylinder 17, itself projecting above the top of casing 5. Handwheel 25 is secured on a hub rotatable in double antifriction bearings 26 in the upper end of cylinder 17. Projecting downwardly from said hub coaxially with the handwheel is a threaded rod 27, extending through a complementarily threaded upper opening in a sleeve 29. The sleeve 29 has a pair of aligned splines 30 projecting outwardly from its upper end and engaging in parallel grooves 31 formed along the sides of the upper bore in cylinder 17, into which upper bore the sleeve projects. Thus, the sleeve 29 is prevented from rotation so that turning of handwheel 25 will cause vertical movement of the sleeve in said upper bore. Projecting axially from the lower end of sleeve 29 is a small-diameter rod 24 which extends sealingly through an aperture formed in the bottom of said upper bore in cylinder 17, so that the lower end of rod 24 penetrates into the upper chamber 21 of the lower bore in said cylinder, in which piston 16 is slidable. Thus, it will be understood that rotation of handwheel 25 in one or the other sense provides a sensitive means for adjusting the pressure in chamber 21 and hence a means for fine adjustment of the vertical position of casing 5. Adjusting operations are facilitated by the provision of a conventional counter device 32 mounted on top of cylinder 17 and actuated by a wheel 33 advanced one increment with each revolution of handwheel 25 by the action of a lug 34. Thus the reading on the dial of counter 32 can provide an indication of the degree of penetration of fine-adjusting needle 24 into pressure chamber 21.

Upon turning now to the arrangements provided at the base of support assembly, it will be seen that the lower end of piston member 4 is formed with a socket having a tapered seating surface 35, earlier referred to, for accommodating the ball member 36" to form with it a swivel joint. As already stated, the jack assembly shown in FIG. 3 refers specifically to the assembly designated L3 in FIG. 1, and accordingly the load-transmitting ball member 36" is free to shift in a horizontal plane relatively to the base 60 as earlier explained. The member 36" consequently has an enlarged integral downward extension formed with an accurately machined flat under-face along its periphery, resting on the flat horizontal surface 40 formed on the top of a frusto-conical member 37 constituting the base generally designated 60 in FIG. 1. Base member 37 is firmly bolted to a metal bedplate 38 embedded and anchored in a concrete footing representing the foundation 39. The upper part of base member 37 is recessed inwardly of the flat peripheral bearing surface 40. Projecting down into this recess is a link 43 whose ball-shaped upper end swivels in a suitable socket formed in the under-side of the load-transmitting ball member 36". The lower end of link 43 carries a spring-seating block 42 against a shoulder of which the lower end of a spring means 41 (e.g. Belleville washers or the like) is seated, the upper end of the spring means being abutted against an upper shoulder in member 37. The spring means 41 serves to assist the force of gravity in firmly urging the load-transmitting member 36 downwardly against the horizontal surface 40 to base 37. It will be understood, however, that in many cases the weight of the structure supported by the tripod mounting described will be sufficient to achieve this result without the assistance of the additional spring-loading means 41 which may then be dispensed with.

Hydraulic means are provided for relieving, when desired, the downward pressure on load-transmitting member 36" on the horizontal top surface 40 of the base, whether such pressure be due to gravity alone, or to gravity plus the force of the spring means 41 as shown in the present embodiment. The pressure-relieving or unloading means include a piston 44 vertically slidable in a bore formed axially of base member 37 below the upper recess therein, the top of the piston being engageable with the lower end of link 43. Below the piston 44 the bore defines a pressure chamber 45 to which hydraulic pressure can be admitted when desired to perform the unloading operation. While the hydraulic pressure to chamber 45 could well be derived from the same source, namely hand pump 14, which actuates the remaining hydraulic elements of the system described, it is here shown as coming from a separate oil pump operated by means of a pedal 50 pivoted in a side of the base member 37 for convenient actuation by the operator's foot. Said separate oil pump comprises a piston 61 slidable in a vertical pump chamber formed in a side of member 37, said piston being connected at its upper end through a pivoted link with the pedal 50. A spring 46 in the pump chamber biasses pump piston 61 and with it pedal 50 to the upper position shown. The pump chamber is connected at its lower end with an oil-reservoir chamber 53 formed in member 37 by way of a passage in which is provided a one-way valve 47 which cuts off the communication between the reservoir and the pump chamber during the downward stroke of the pump piston 61 but permits such communication during the upward stroke. The lower end of the pump chamber further communicates with the pressure chamber 45 through a passage provided with a one-way valve 48 which cuts off communication between said chamber 45 and the pump chamber on the upward stroke of the pump piston 61 but permits such communication on the downward stroke thereof. The bottom of reservoir chamber 53 communicates with the passage leading to pressure chamber 45 through a vertical bypass in which is positioned a valve 51 biased to a sealing position by a light spring, the stem of this valve 51 bearing on the tip 49 of the pedal 50. It will be clear from the arrangement shown that in the normal or idle condition illustrated, with the pedal 50 biased upwards by the pump spring 46, the tip 49 of pedal 50 acting through the stem of valve 51 unblocks the bypass against the low bias of the light spring of this valve, so that in such idle condition the pressure chamber 45 communicates with the reservoir and there is no over-pressure acting to lift the piston 44. Another bypass between the reservoir chamber 53 and the passage leading to pressure chamber 45 is provided with a pressure-limiting valve 52 having a biasing spring calibrated to a prescribed limiting pressure value as later explained. The upper end of reservoir chamber 53 communicates with the atmosphere through a filling orifice provided with a plug 54 formed with a small vent sealed in turn by a filter plug not shown. A bellows 55 attached around the projecting end of pedal 50 and to the periphery of the aperture through which the pedal extends into the base member 37 protects the hydraulic mechanism described against dirt and other foreign matter.

It will be understood that the supporting-leg assembly L2 (FIG. 1) may be entirely similar to the assembly L3 just described and shown in FIG. 3, except for the mounting of the load-transmitting member 36' with respect to the base. That is, instead of the support of the member 36" resting simply by way of a flat undersurface on a flat surface 40 at the top of the base member, as shown in FIG. 3, said support would be constructed in the manner shown in FIG. 2 and earlier described so as to permit only sliding displacement of load-transmitting member 36' in one direction with respect to the base. As regards the remaining supporting-leg assembly L1, this may be considerably simplified since in it the ball member 36 may be fixedly secured to the related base member 37 and the hydraulic unloading means in said base member can then be omitted. If desired, however, the load-transmitting ball member 36 in assembly L1 may be detached from the base member, means being provided to prevent lateral shifting thereof relative to said base member without preventing its being lifted off vertically therefrom, and in such case the hydraulic unloading means may also, if desired, be provided in said supporting assembly L1.

The procedure used in adjusting the attitude or vertical setting of the tripod mount according to the invention will now be described. It will be understood that such adjustment may involve the vertical adjustment of one, two, or all three of the support assemblies L1, L2, L3 in order to set the general elevation of a seating surface, such as 0, of the pedestal 1 at a desired level, and to set the axis A thereof in a strictly vertical position, as indicated by suitable precision measuring instruments of conventional character. First of all it is necessary to relieve the lateral pressure exerted by presser members 10 against the plunger 4 to permit the latter being displaced vertically as desired. It will be understood in this connection that in the normal operative condition of the system the three-way valve 57 is positioned so that the pressure chambers 12 of both lateral presser assemblies are connected to the oil tank 62 at substantially atmospheric pressure. Under these conditions the only force acting on the presser members 10 is the force of the spring stacks 9, exerting a lateral force as indicated at F1 (FIG. 5) against the flat bearing surface 8 of plunger 4. The force F1 is transmitted as the two radial component forces F2 and F3 acting at the bearing surfaces 6 and 7 to press the plunger 4 firmly against the wall of its bore in casing 5, thus normally preventing any disturbance of a selected vertical setting of the tripod frame under the influence of extraneous forces. To release one of the casings 5 for relative displacement with respect to its plunger 4 when it is desired to alter the selected setting, valve 57 is displaced to its reverse position wherein the pressure chambers 12 are both disconnected from oil tank 62 and connected instead to pump 14. The pump 14 is then actuated, e.g. manually, to admit pressure oil into the chambers 12 to retract the presser members 10 sufficiently to allow the desired relative displacement between plunger 4 and casing 5 to be effected.

Thereafter, the four-way valve 56, which in the previous normal condition of the system was in its neutral position in which both pressure chambers 20, 21 of the vertical actuator cylinder 17 were sealed off from the oil circuit and hence pressure-locked, is shifted to one or the other of its side positions depending on the sense of the vertical adjustment required. Assuming it is desired to raise the casing 5 relatively to plunger 4, valve 56 is displaced in the sense required to connect upper chamber 21 to pump 14 and lower chamber 20 to reservoir 62. Then the pump 14 is actuated, increasing the pressure in the upper actuator chamber 21 and thereby causing upward displacement of the actuator cylinder 17 and with it the casing 5 with respect to the actuator piston 16 and plunger 4 suspended from it. When hand pump 14 has been actuated a sufficient number of times to produce a total upward displacement of casing 5 approximating the desired adjustment, selector valve 56 is returned to neutral, thereby locking the pressures in chambers 20 and 21 at the values attained therein. The fine adjusting handwheel 25 is then rotated to project the needle 24 deeper into, or retract it from, the upper chamber 21 so as to vary the pressure therein at a slow, sensitive, rate until the final desired adjustment has been accurately attained, as indicated by the high-precision leveling instruments of the turret or other structure supported on the pedestal. At this time the three-way valve 57 is actuated to connect the chambers 12 of the side presser assemblies to oil tank 62, whereupon the springs 9 will act on the presser heads 10 to lock the plunger 4 in its new adjusted position relative to casing 5.

If downward rather than upward displacement of casing 5 with respect to plunger 4 was desired, then, after retraction of the lateral pressers 10 as described above, valve 56 is displaced to a reverse position in which upper actuator chamber 21 is connected to reservoir 62. It is unnecessary in this case to actuate pump 14, since the weight of the movable assembly will produce the desired lowering of casing 5 with respect to plunger 4 with a corresponding circulation of oil around the circuit. The rate of descent can be controlled by suitable manipulation of the actuating handle of valve 56 which will control the rate of oil flow. After casing 5 has thus been lowered approximately to the new level desired, valve 56 is returned to neutral, and adjustment is completed by acting on the fine-adjusting handwheel 25 as earlier explained. Finally valve 57 is returned to its normal position in which chambers 12 are connected to the oil tank 62, causing the presser members 10 to lock the plunger 4 in its adjusted position under the force of springs 9.

It will be noted that when the structure is disengaged from its foundations the above-described system can serve to raise the plunger 4 in order to disengage it from the associated load-transmitting member 36, 36' or 36" by displacing valve 56 in the sense to connect lower chamber 20 with the pump 14 and upper chamber 21 with the reservoir, and actuating the pump to raise plunger 4 with respect to casing 5 which is then held stationary by suitable means not shown.

The temperature-compensating step earlier referred to will now be described. It will be understood that the need for this operation arises essentially out of thermal inertia, coupled with the low degree of thermal coupling present between the tripod frame and its base structure at the ball members 36, 36', 36". Owing to these factors, the base members 37 of relatively small heat capacity will generally be substantially at the temperature of bedplate 38 and ground, hence at a slow-changing temperature level, while the tripod frame and the supported structure as a whole will be exposed to relatively faster changes in temperature from the atmosphere. Thus at a given instant considerable temperature differentials in either sense can be present between the tripod frame 1 and the bedplate 38, with corresponding differences in thermal expansion and dimensions. If at one time thermal and dimensional equilibrium is obtained as between the tripod frame 1 and bedplate 38, as will generally be true at the time the structure is installed, then at a subsequent time this may no longer be true and the resulting dimensional changes will, owing to the high downward vertical pressure urging the tripod frame upon its bases, generate considerable mechanical strains in the structure, liable to falsify any measurements made. Thus, assuming the temperature of the tripod frame has increased more rapidly than that of bedplate 38 and base members 37, the sides of the triangle defined by the frame will be larger than those of the triangle defined by the bases 37, and the three ball members 36, 36', 36" instead of engaging their conical seating surfaces 35 around their full circumferences, will only engage limited areas at the sides directed inwardly of the triangle. These and similar objectionable conditions due to temperature effects are eliminated through the temperature-compensating structure described whereby, prior to the performance of any accurate measuring or other operation to be performed by means of the structure supported on the tripod, two of the three points of support of the latter constituted by the load-transmitting members 36, 36', 36" are allowed to seek out a new relative position of equilibrium in which any strains and tensions due to thermal differentials will be relieved.

As will be seen from FIG. 3, in the normal or idle condition shown the lower end of link 43 just clears the upper surfaces of piston 44, so that the load-transmitting member 36" bears against the horizontal base surface 40 under the full pressure generated by the weight of the structure, assisted (in the embodiment shown) by the downward thrust developed by spring stack 41. To relieve this combined stress, the operator actuates pedal 50 by depressing it with his foot a number of times without allowing the pedal to rise back to its uppermost position between actuations. At each depression of pedal 50, pump piston 61 discharges a small amount of oil into the chamber 45 below piston 44, lifting the piston by a small increment. At each upward stroke of pump piston 61 under the force of spring 46, a fresh amount of oil is drawn in from reservoir 64 through one-way valve 47. The pedal should not be allowed to rise fully to its idle position between strokes in order to maintain bypass valve 51 closed during the operation as earlier explained. The piston 44 acting by its upper surface on the lower end of link 43 gradually relieves the load-transmitting member 36" more and more of the downward pressure acting on it. When the resultant differential pressure acting on the load-transmitting member is barely sufficient to apply said member against the flat surface 40 with a slight positive (i.e. downward) loading force, the automatic pressure-limiting valve 52, whose biasing spring has been correctly calibrated to permit this action, opens, allowing excess pressure fluid from chamber 45 to leak back into the reservoir 53, so that further depressions of pedal 50 will be inoperative to raise the piston 44 any further. In this condition, the load-transmitting member 36" is able to shift over the flat surface 40 under the action of the strains mentioned above until it has found for itself a new position of balance in which such strains are abolished. After the operator takes his foot off pedal 50, the spring 46 returns it to its normal uppermost position shown, in which the inner end of the pedal acts through valve stem 51 to connect permanently the chamber 45 with reservoir 53. Piston 44 then drops back to its idle position, so that the load member 36" now is again arrested in its new position by the combined actions of gravity and the thrust of springs 41. The operator can then proceed to the supporting assembly L2 to perform a similar stress-relieving operation thereat, whereupon all internal strains in the tripod frame due to temperature differentials will have been released, and all three load transmitting members 36, 36', 36" will engage the conical surfaces of their sockets 35 along uniform circular pressure areas. Preferably, the temperature-compensating unloading operations just described are carried out just before the vertical adjusting operations previously described.

A more thorough insight into the temperature-compensating process described above may perhaps be gained from the following brief considerations of the station involved. Referring to FIG. 3, it is assumed that the differential expansion between the tripod frame and its base structure is such that the plunger 4 is applying to the ball 36" at socket surface 35 a large force F4 localized in the left-hand area (as shown) rather than smaller forces equally distributed all around said surface. Force F4 is of course normal to surface 35 and directed towards the center of the sphere. The force F4 is transmitted along its line of action to the flat supporting plane 40 where it can be broken down, as shown, into a rightward horizontal force F5 on said plane and a vertical force F6 directed downwardly. The vertical downward component F6 combines with the downward force F7 developed by spring stack 41 to produce, in the normal condition of the system, the strong downward pressure serving to lock the structure firmly against lateral shifting on its base under external disturbing forces. In other words, whenever there is a lateral shifting tendency, this vertical pressure generates a horizontal frictional force on the plane 40 which effectively resists such tendency. This friction force therefore also effectively prevents lateral shifting of the ball member in response to the unbalance force F5, as would be required to enable the structure to be restored to a condition of dimensional equilibrium. Actuation of the pedal 50 as described above applies, by way of piston 44 and link 43, an upward force to load-transmitting member 36" which detracts from said downward pressure sufficiently to reduce the frictional force to a value smaller than the lateral unbalance force F5, whereupon the lateral shifting and consequent restoration to balance becomes possible.

It will be apparent that various modifications may be introduced into the structure illustrated and described without exceeding the scope of the invention as claimed. For example, the locking forces herein shown as normally exerted by spring means may be produced by fluid pressure. In other words, the lateral locking devices including the presser members 10, and/or the vertical locking device including the piston 45, may be given the form of double-acting fluid actuators instead of the single-acting actuators shown herein. Other variants will also be apparent to persons skilled in the art.

What is claimed is:

1. A tripod structure comprising a frame; a foundation; three supports secured to the frame at the apices of a triangle and provided each with a base fixedly secured to said foundation and with a load-transmitting member on said base, the load-transmitting members of at least two of said supports being laterally shiftable relatively to their respective bases but being normally urged thereagainst under downward pressure with sufficient friction to prevent their shifting; and actuator means in the bases of the last-mentioned supports engageable with said shiftable members and operable for applying vertical pressure-relieving forces thereto to reduce said friction to a value small enough to allow said shiftable members to move laterally for compensating dimensional changes caused by differential thermal expansion between said frame and said foundation.

2. A tripod structure as defined in claim 1 wherein one of said members is provided with mounting means restraining it against lateral shifting on its base, another of said members is provided with mounting means constraining it to shift along a linear path relative to its base toward and away from said one of said members, and the third of said members is provided with mounting means permitting it to shift in any direction in a horizontal plane on its base.

3. A tripod structure as defined in claim 1 wherein each of said shiftable members is provided with mechanism for limiting its pressure-relieving force to a magnitude slightly less than that required for complete neutralization of said downward pressure.

4. A tripod structure as defined in claim 3 wherein said actuator means includes fluid-responsive piston means having a fluid-supply line provided with a spring-loaded valve for determining the maximum of said pressure-relieving force, said mechanism including bypass-forming means for said line normally maintaining the fluid pressure in said line at zero in a normal position of the associated actuator means and biasing means tending to maintain said actuator means in said normal position.

5. A tripod structure as defined in claim 4 wherein said actuator means comprises a pedal on each of said bases, said biasing means including spring means coupled with said pedal.

6. A tripod structure comprising a frame; a foundation; three legs secured to the frame at the apices of a triangle; three bases fixedly secured to said foundation in alignment with said legs and provided each with a load-transmitting member having an upper surface which forms a swivel joint with a co-operating lower surface of the respective leg, the load-transmitting members of at least two of said supports being laterally shiftable relatively to their respective bases but being normally urged thereagainst under downward pressure with sufficient friction to prevent their shifting; and actuator means in the bases of the last-mentioned supports engageable with said shiftable members and operable for applying vertical pressure-relieving forces thereto to reduce said friction to a value small enough to allow said shiftable members to move laterally for compensating dimensional changes caused by differential thermal expansion between said frame and said foundation.

7. A tripod structure as defined in claim 6 wherein one of said members is provided with mounting means restraining it against lateral shifting on its base, another of said members is provided with mounting means constraining it to shift along a linear path relative to its base toward and away from said one of said members, and the third of said members is provided with mounting means permitting it to shift in any direction in a horizontal plane on its base.

8. A tripod structure as defined in claim 6 wherein said shiftable members are provided with peripheral formations defining a central recess on each member and bearing upon their respective bases, said actuator means including an upstanding element for each shiftable member engaging same at the recess thereof.

9. A tripod structure as defined in claim 8 wherein said upstanding element is pivotally joined to the shiftable member at said recess.

10. A tripod structure as defined in claim 6 wherein each of said shiftable members is provided with loading means supplementing the force of gravity for creating said downward pressure.

11. A tripod structure as defined in claim 10 wherein said loading means comprises spring means anchored to each shiftable member and its base.

12. A tripod structure comprising a frame; a foundation; three legs secured to the frame at the apices of a triangle and provided each with a downwardly projecting vertically displaceable element; three bases fixedly secured to said foundation and provided each with a load-transmitting member having an upper surface which forms a swivel joint with a co-operating lower surface on the vertically displaceable element of the respective leg, the load-transmitting members of at least two of said supports being laterally shiftable relatively to their respective bases; and control means individual to said legs for adjusting the elevation of said vertically displaceable element relative to said frame.

13. A tripod structure as defined in claim 12 wherein one of said members is provided with mounting means restraining it against lateral shifting on its base, another of said members is provided with mounting means constraining it to shift along a linear path relative to its base toward and away from said one of said members, and the third of said members is provided with mounting means permitting it to shift in any direction in a horizontal plane on its base.

14. A tripod structure as defined in claim 12 wherein means are provided for normally urging said shiftable members against their bases under pressure with sufficient friction to prevent their shifting, further comprising actuator means in the last-mentioned bases engageable with said shiftable members and operable for applying vertical pressure-relieving forces thereto to reduce said friction to a value small enough to facilitate lateral movement of said shiftable members.

15. A tripod structure comprising a frame; a foundation; three leg assemblies secured to the frame at the apices of a triangle, each of said assemblies including a tubular leg with a substantially vertical passage and a plunger vertically slidable in said passage and projecting therefrom at its lower end; locking means in each leg assembly disposed for lateral engagement of said plunger, said locking means being normally operative to immobilize said plunger in said passage against vertical displacement; release means coupled with said locking means for deactivating same; setting means operable in the deactivated condition of said locking means for changing the elevation of said plunger at said passage; and support means on said foundation engaging the projecting lower ends of the plungers of said assemblies.

16. A tripod structure as defined in claim 15 wherein said support means comprises three load-transmitting members each coupled by a swivel joint with the lower end of the respective plunger.

17. A tripod structure as defined in claim 15 wherein said locking means comprises a spring-loaded element normally bearing upon a side of said plunger and manually controllable fluid-pressure means for withdrawing said element from said plunger.

18. A tripod structure as defined in claim 16 wherein said plunger is of generally cylindrical shape and received in said passage with clearance over a major part of its circumference, said plunger being formed with two radially projecting shoulders bearing upon the inner wall of said passage at locations approximately 120° apart from each other and from the location of said element.

19. A tripod structure as defined in claim 15 wherein said setting means comprises a cylinder housing suspended within said tubular leg at the top of said passage, a piston vertically slidable in said cylinder and provided with a projecting lower end engaging said plunger, a source of fluid pressure communicating with the interior of said cylinder, and valve means for controlling the admission of fluid from said source to said cylinder.

20. A tripod structure as defined in claim 19 wherein said piston has a head dividing the interior of said cylinder into an upper and a lower compartment, said setting means further comprising fine-adjustment means including a rod selectively movable into and out of one of said compartments.

References Cited by the Examiner

UNITED STATES PATENTS

| 2,069,590 | 2/37 | Neumann et al. | 248—163 |
| 2,446,127 | 7/48 | Cramer | 248—400 |
| 2,819,873 | 1/58 | Pearne | 248—354 |
| 2,971,736 | 2/61 | Enneper | 248—163 |
| 2,995,331 | 8/61 | Stanton | 248—163 |
| 3,081,059 | 3/63 | Hastings et al. | 248—163 |

FOREIGN PATENTS 590,190  1/60  Canada.

CLAUDE A. LE ROY, *Primary Examiner.*